United States Patent
Jeong (10) Patent No.: US 11,845,543 B2
(45) Date of Patent: Dec. 19, 2023

(54) INFINITE WIRELESS CHARGING OF A UAS (UNMANNED AERIAL SYSTEM) WITH POWER INFRASTRUCTURE

(71) Applicant: THE BOARD OF TRUSTEES OF THE UNIVERSITY OF ALABAMA, Tuscaloosa, AL (US)

(72) Inventor: Nathan Seongheon Jeong, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 317 days.

(21) Appl. No.: 17/124,720

(22) Filed: Dec. 17, 2020

(65) Prior Publication Data

US 2021/0403158 A1   Dec. 30, 2021

Related U.S. Application Data (60) Provisional application No. 62/982,924, filed on Feb. 28, 2020.

(51) Int. Cl.
| | | |
|---|---|---|
| H02J 7/00 | (2006.01) | |
| B64C 39/02 | (2023.01) | |
| H02J 50/10 | (2016.01) | |
| H02J 50/00 | (2016.01) | |
| H02J 7/34 | (2006.01) | |
| B64U 50/34 | (2023.01) | |

(52) U.S. Cl.
CPC ............ *B64C 39/024* (2013.01); *H02J 7/345* (2013.01); *H02J 50/005* (2020.01); *H02J 50/10* (2016.02); *B64U 50/34* (2023.01); *H02J 2207/50* (2020.01); *H02J 2310/44* (2020.01)

(58) Field of Classification Search
None
See application file for complete search history.

(56) References Cited

U.S. PATENT DOCUMENTS

| 7,440,780 B2 | 10/2008 | Mickle et al. | |
|---|---|---|---|
| 2017/0110901 A1* | 4/2017 | Amarasekara | .......... B64F 1/007 |

FOREIGN PATENT DOCUMENTS

| CN | 102591355 A | 7/2012 |
|---|---|---|
| CN | 204156878 U | 2/2015 |
| WO | 2014003862 A2 | 1/2014 |
| WO | 2019236511 A1 | 12/2019 |

* cited by examiner

*Primary Examiner* — Arun C Williams
(74) *Attorney, Agent, or Firm* — Meunier Carlin & Curfman LLC (57) ABSTRACT

Systems and methods for enabling infinite wireless charging of unmanned aerial systems (UASs) are provided. A UAS detects sources of power and wirelessly charges itself by collecting ambient electromagnetic energy from a power infrastructure. A UAS in accordance with features and aspects described herein is autonomous, may always be wirelessly charged (e.g., with high induced voltage), and can make use of weak energy. Moreover, various charging techniques can be used, such as in-flight, trickle, perching, and/or parking. Dynamic flight is supported using multi-angle MIMO coils. Additionally or alternatively, faster charging can be achieved with a supercapacitor and slower charging can be achieved with a battery.

15 Claims, 9 Drawing Sheets

INFINITE WIRELESS CHARGING OF A UAS (UNMANNED AERIAL SYSTEM) WITH POWER INFRASTRUCTURE

CROSS-REFERENCE TO RELATED APPLICATIONS

This application claims the benefit of priority to U.S. Provisional Patent Application No. 62/982,924, filed on Feb. 28, 2020, entitled "INFINITE WIRELESS CHARGING OF A UAS (UNMANNED AERIAL SYSTEM) WITH POWER INFRASTRUCTURE," the contents of which are hereby incorporated by reference in their entirety.

STATEMENT OF GOVERNMENT SUPPORT

This invention was made with government support under N68335-19-C-0355 awarded by the Office for Naval Research. The government has certain rights in the invention.

BACKGROUND

Unmanned aerial systems (UASs) are essential in many areas such as transportation, disaster relief, emergencies, and surveillance. However, typical flight times of a UAS are on the order of about 20 to 30 minutes. UASs are known under various different names and acronyms, such as "Unmanned Aerial Vehicle" (UAV), "aerial robot" or "drone," for example.

The flight of UASs may operate with various degrees of autonomy, such as under remote control by a human operator (with a system of communications between the two) or autonomously by onboard computers, for example.

Due to high battery consumption, the average flight time for conventional UASs is typically only about 20-30 minutes. Longer flight times are necessary to withstand increasing flight range and payloads. Current UASs do not charge autonomously.

It is with respect to these and other considerations that the various aspects and embodiments of the present disclosure are presented.

SUMMARY

Systems and methods for enabling infinite wireless charging of UASs are provided. A UAS detects sources of power and wirelessly charges itself by collecting ambient electromagnetic energy from a power infrastructure.

An implementation comprises a method of wirelessly charging an unmanned aerial system (UAS). The method includes: during flight, detecting a power infrastructure, by the UAS; navigating to the power infrastructure, by the UAS; and autonomously charging an energy storage device of the UAS using the power infrastructure, by the UAS.

An implementation comprises an unmanned aerial system (UAS). The UAS includes: a power infrastructure sensor configured to detect, during a flight of the UAS, a power infrastructure; a navigational system configured to navigate the UAS to the power infrastructure; an energy storage device configured to provide power to the UAS; and a charging module configured to autonomously charge the energy storage device of the UAS using the power infrastructure.

An implementation comprises a system for wirelessly charging an unmanned aerial system (UAS). The system includes: at least one processor; and a memory storing instructions that when executed by the at least one processor cause the at least one processor to: detect a power infrastructure during flight of the UAS; navigate the UAS to the power infrastructure; and autonomously charge an energy storage device of the UAS using the power infrastructure.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

The description is not to be taken in a limiting sense, but is made merely for the purpose of illustrating the general principles of the invention, since the scope of the invention is best defined by the appended claims.

Various inventive features are described herein that can each be used independently of one another or in combination with other features.

Figure 1:
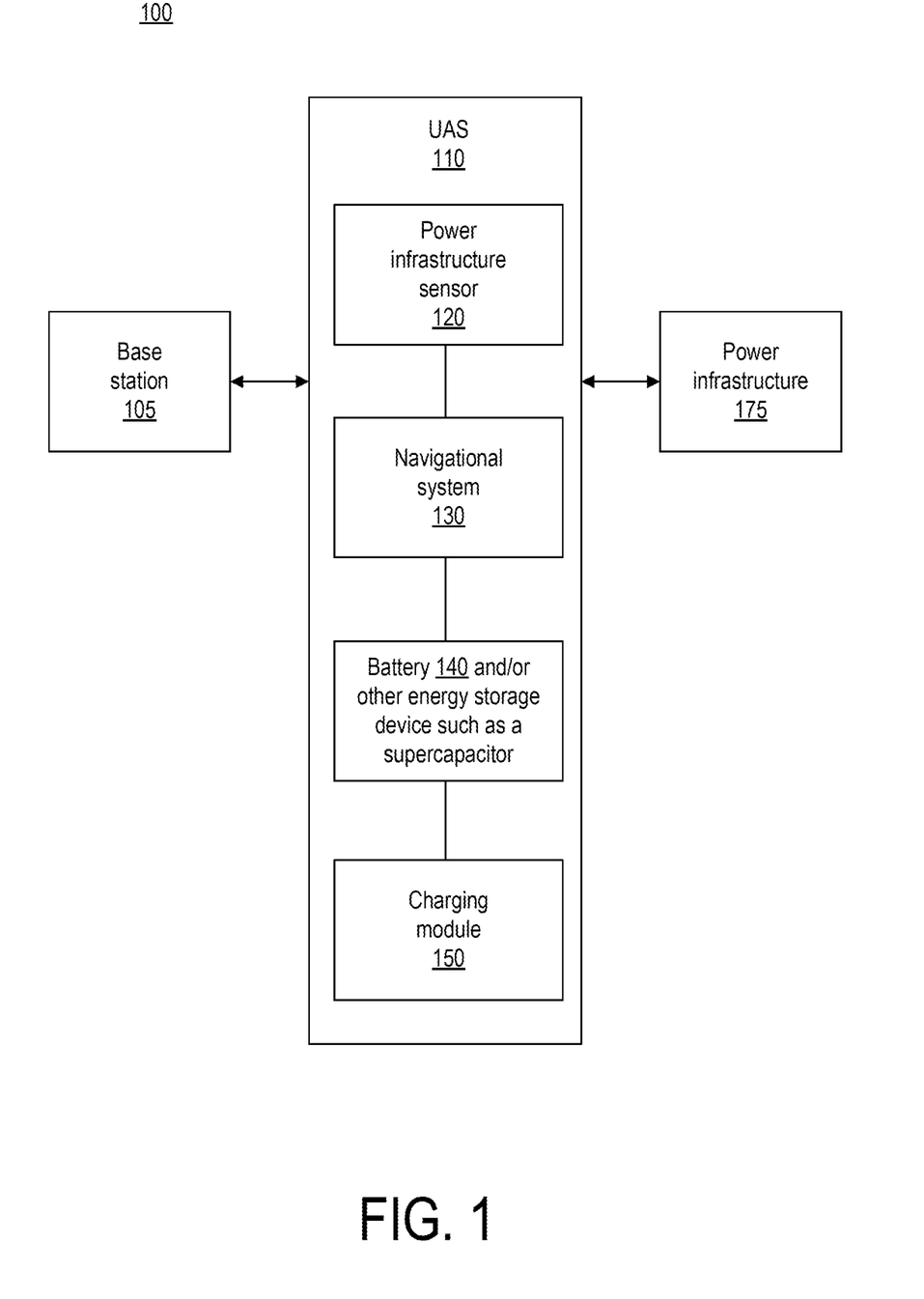
FIG. 1 is an illustration of an exemplary environment for a unmanned aerial system (UAS)

FIG. 1 is an illustration of an exemplary environment 100 for a unmanned aerial system (UAS) 110. The environment 100 may include a base station 105, the UAS 110, and a power infrastructure 175. The base station 105 may allow communication and/or control of the UAS 110. It is contemplated that any conventional or known base station typically for use with UASs may be used in accordance with the UAS and techniques described herein.

The power infrastructure 175 may be a known power grid (or electrical grid) comprising transmission lines such as high voltage transmission lines or power stations. The power infrastructure may be a known electric power transmission network.

The UAS 110 may be any type of UAS and adjusted to comprise a power infrastructure sensor 120, a navigational system 130, a battery 140 and/or other energy storage device such as a supercapacitor, and a charging module 150, as described further herein.

The power infrastructure sensor 120 detects a nearby power infrastructure, like the power infrastructure 175, so that the UAS 110 can navigate to the power infrastructure 175 to charge the battery 140. The navigational system 130 navigates the UAS 110 to the detected power infrastructure 175. Depending on the implementation, the UAS 110 may hover nearby the power infrastructure 175 while the charging module 150 charges the battery 140 using power from the power infrastructure 175, or the UAS may perch on the power infrastructure 175 while the charging module 150 charges the battery 140 or other energy storage device such as a supercapacitor, or combination of battery and supercapacitor using power from the power infrastructure 175. In some implementations, a UAS may equip with two types of energy storage devices such as a battery and a supercapacitor. A battery is good for long-term flight use as it provides high energy density. A supercapacitor is extremely useful in taking off or landing where a UAS requires significant power. The reason of the instantaneous large power consumption using a supercapacitor is that it can provide high power density, typically up to a second order of power (100 times).

Although only one UAS 110 is shown in FIG. 1, there is no limit to the number of UASs 110 that may be supported. Similarly, there is no limit to the number of batteries 140 and/or other energy storage devices that may be supported in the UAS 110.

Figure 13:
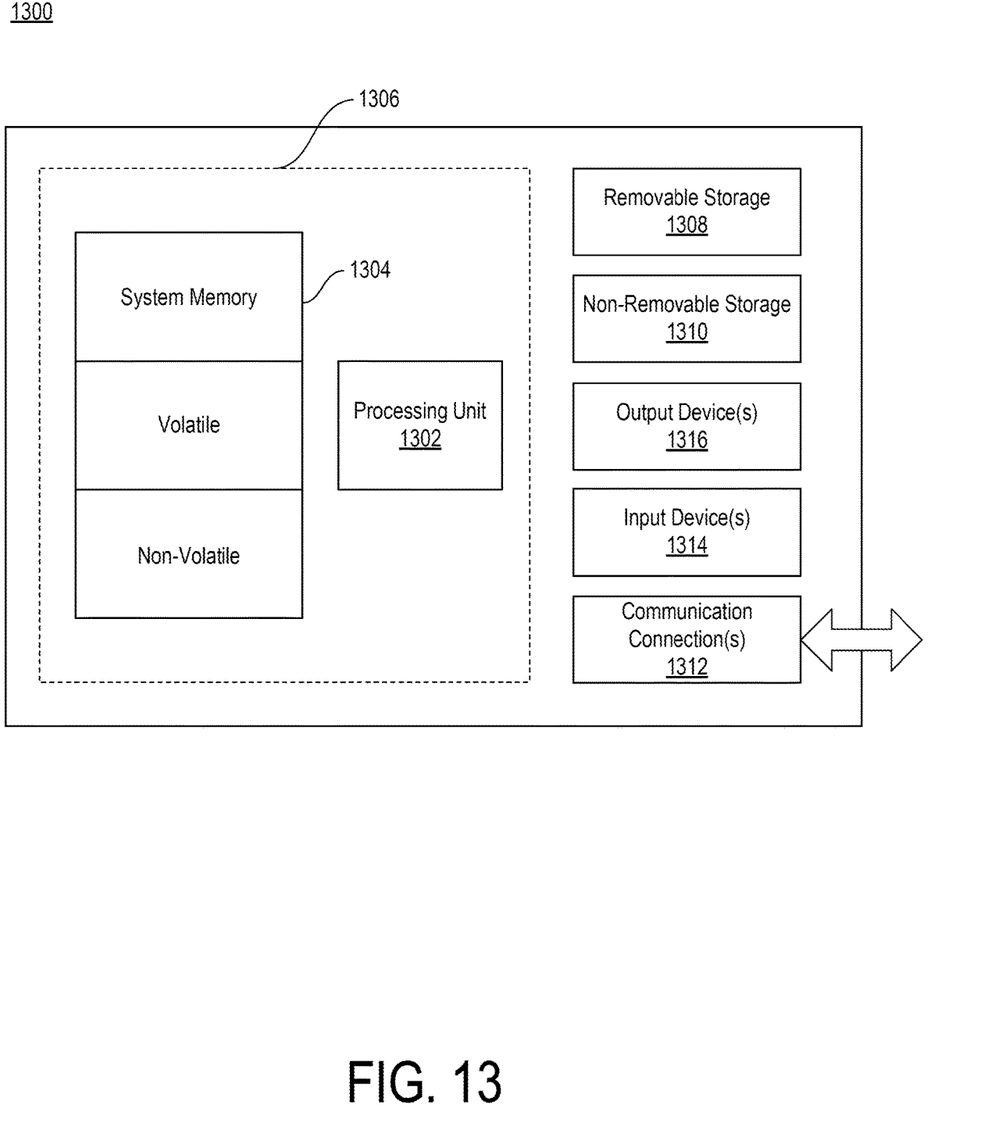
FIG. 13 shows an exemplary computing environment in which example embodiments and aspects may be implemented.

The UAS 110 may comprise a computing device, such as a computing device that is illustrated in FIG. 13 as the computing device 1300.

Figure 2:
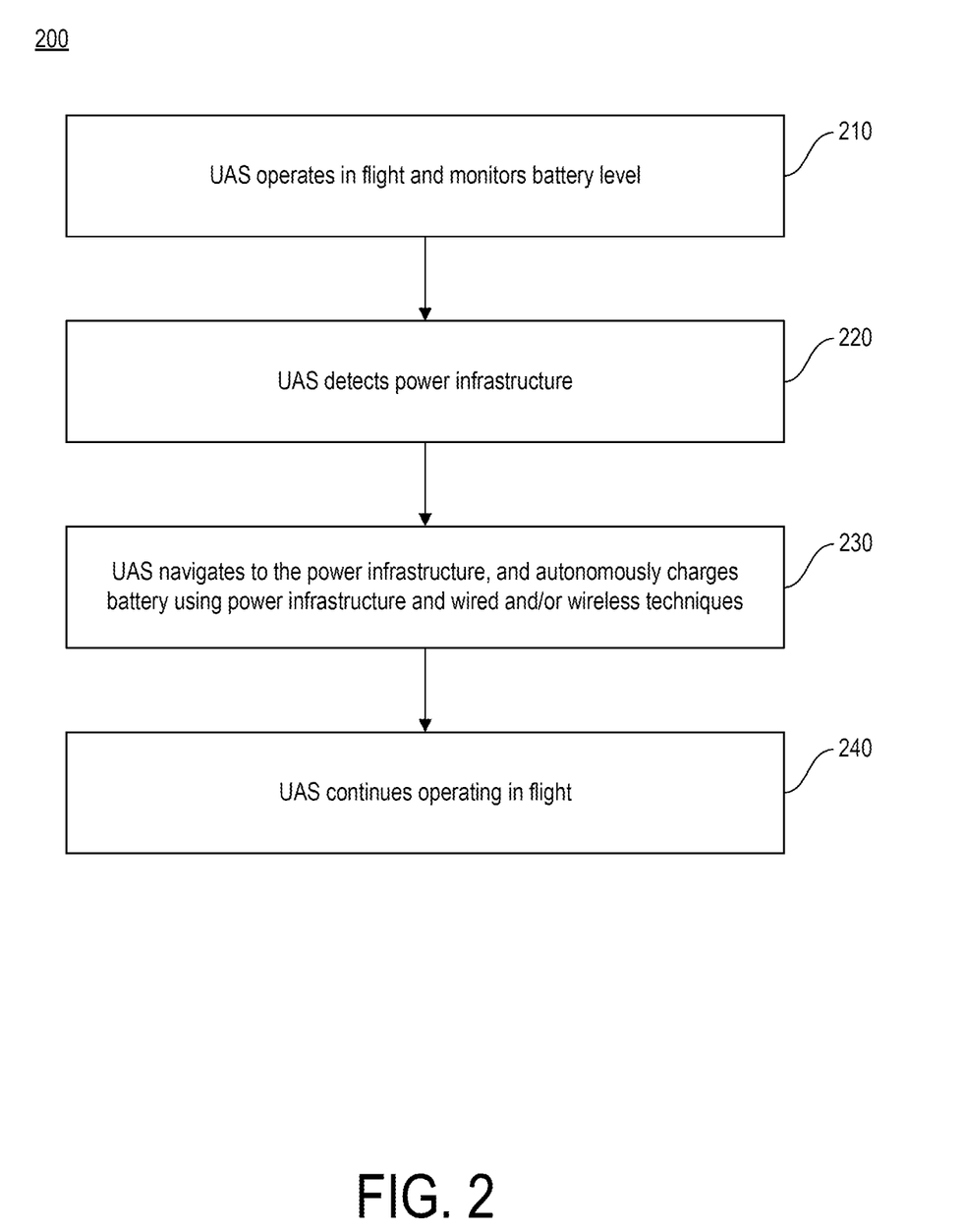
FIG. 2 is an operational flow of an implementation of a method of wirelessly charging a UAS with a power infrastructure.

FIG. 2 is an operational flow of an implementation of a method 200 of wirelessly charging a UAS with a power infrastructure. At 210, a UAS, such as the UAS 110, is deployed and operates in flight and may monitor its power level such as a battery level (e.g., the amount of power remaining in its battery 140) or other energy storage device.

At 220, the UAS detects a power infrastructure, such as the power infrastructure 175, using a power infrastructure sensor, such as the power infrastructure sensor 120. Depending on the implementation, the power infrastructure sensor may operate continuously to detect a power infrastructure or may operate only when the battery level of the battery is lower than a certain threshold. The threshold may be predetermined or may be dynamic, and/or may be fixed or adjustable.

At 230, the UAS navigates to the detected power infrastructure and autonomously charges the battery (with the charging module) using the power infrastructure in accordance with one or more of the techniques described further herein. Various charging methods may be used, such as in-flight charging that uses ambient electromagnetic energy; trickle charging which provides dynamically charging power control through detecting nearby electromagnetic radiation; stationary charging including at least one of perching, parking, or resting on at least one of high-voltage power lines, substations, or infrastructure; and multi-angle MIMO (multiple input, multiple output) charging which comprises increasing mutual coupling through multi-angle coils. These various methods may be used alone, separately, or in combination with one another. One or more of these various methods may be used, depending on the implementation.

After charging is completed, the UAS may continue operating in flight, at 240. The UAS may perform many services, such as inspecting power lines and towers, searching for animals and people, aerial videography and photography, assessing vegetation and reforestation services, monitoring lake conditions, inspecting and investigating transportation services and facilities, and delivering consumer packages, for example.

Figure 3:
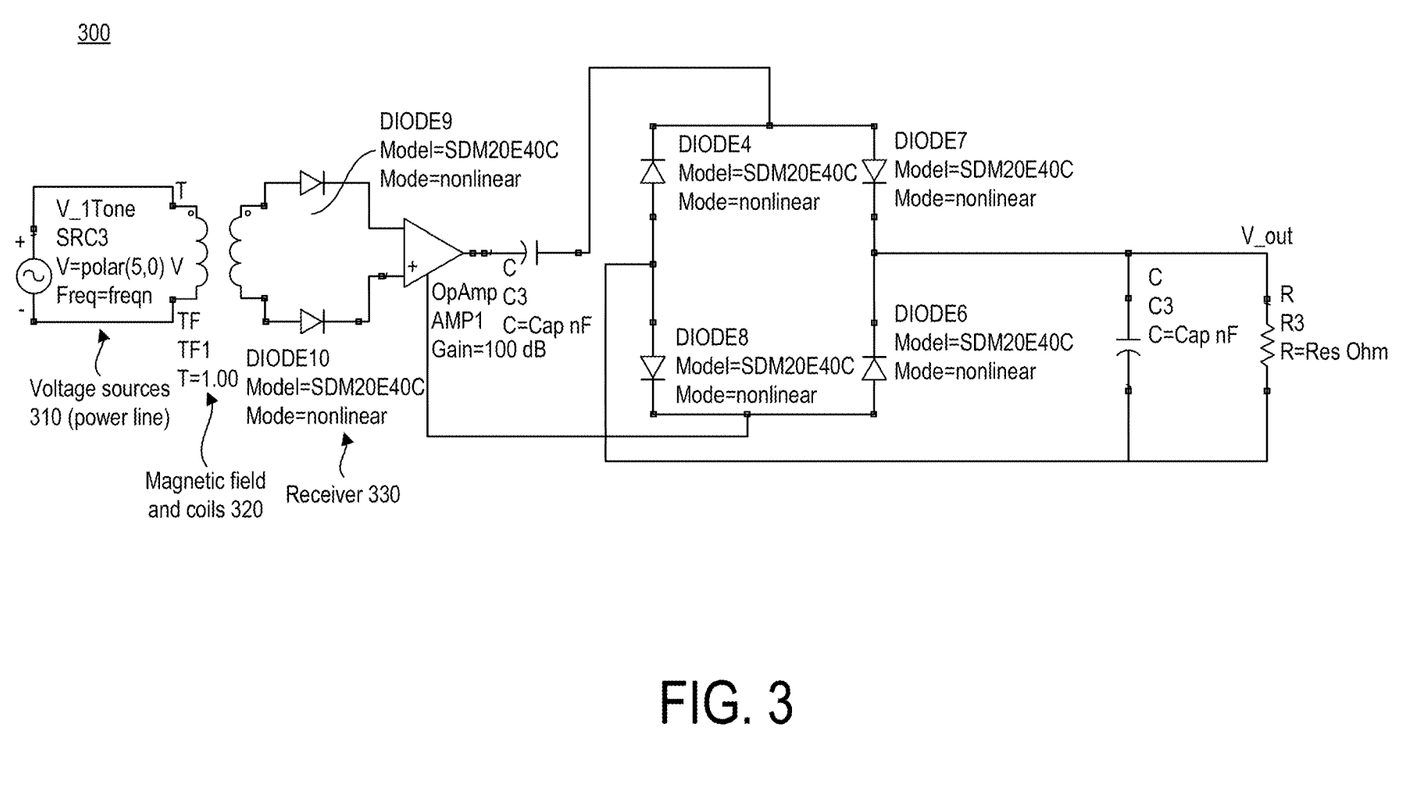
FIG. 3 is an illustration of an implementation of a circuit for charging a UAS with a power infrastructure.

FIG. 3 is an illustration of an implementation of a circuit 300 for charging a UAS, such as the UAS 110, with a power infrastructure, such as the power infrastructure 175. The operating frequency of power lines are 60 Hz in the USA or 50 Hz in some other countries. This significantly limits the available voltage induced from the high-energy power line.

Here, nonlinear components are used to generate higher voltage to collect more power efficiently. The induced voltage is boosted to increase rectifying frequency by applying a non-linear component which can generate multiple harmonic frequencies. For instance, passive diodes are series connected with the receiving coil. Due to high magnitude of power signal, the harmonics are fairly high.

Thus, frequency is increased to induce higher voltage. In this manner, frequency multiplexing is used to charge the battery of the UAS. A voltage source 310, such as a power line of the power infrastructure, provides the power to a receiver 330 of the UAS, via a magnetic field and coils 320.

Figure 4:
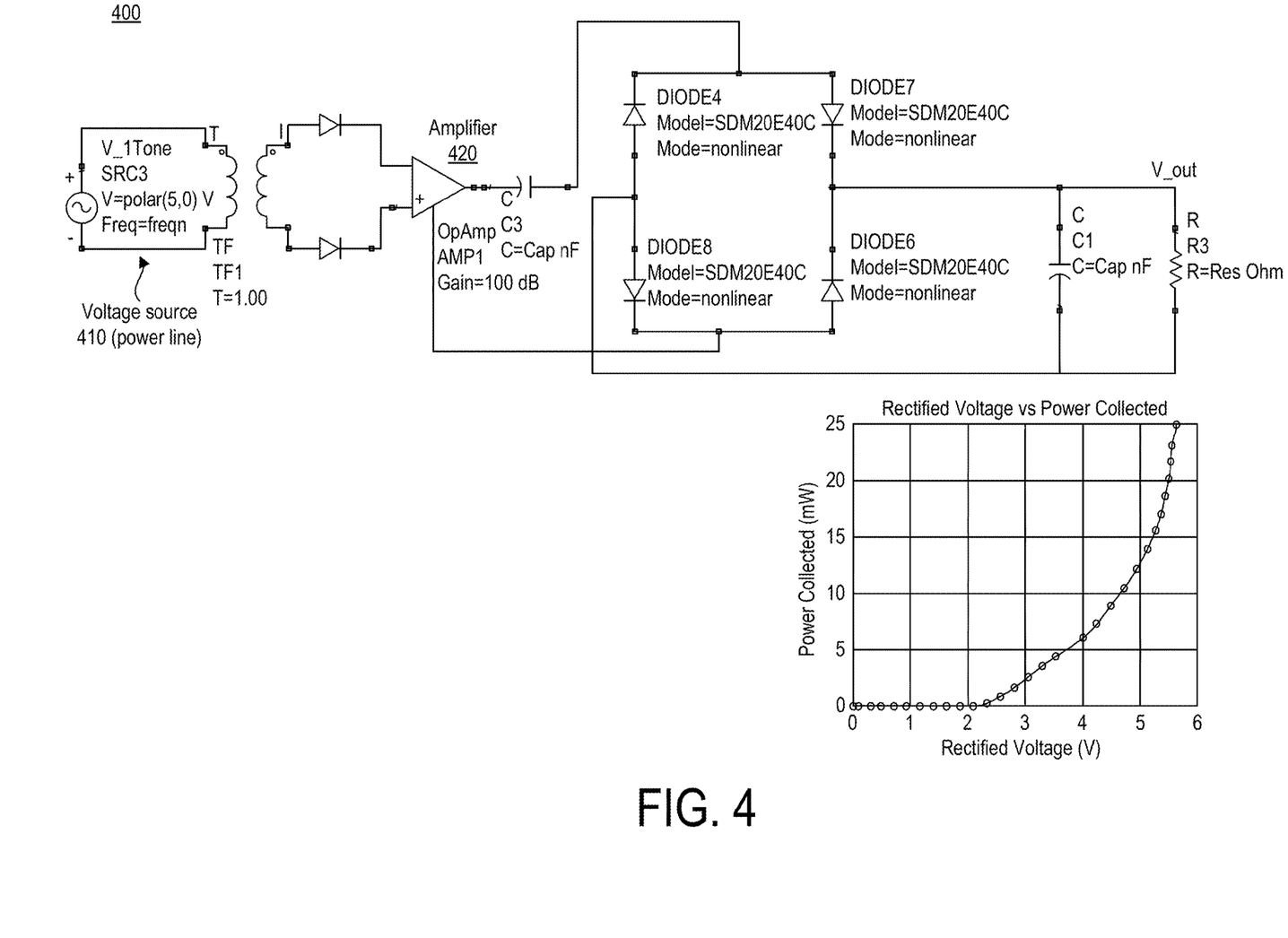
FIG. 4 is an illustration of another implementation of a circuit for charging a UAS with a power infrastructure.

FIG. 4 is an illustration of another implementation of a circuit 400 for charging a UAS, such as the UAS 110, with a power infrastructure, such as the power infrastructure 175. Here, an amplifier 420 is used to amplify the small current or voltage from the power line 410.

At a relatively far distance, energy strength is too weak to be rectified. Thus, amplitude amplification is used. To increase a charging distance, the amplifier 420 is incorporated to support wide range of power distribution. For example, a small battery can be used to power up an operational amplifier with 20 dB of gain, while consuming only 0.9 µW yet collecting 25 mW of power. This induced signal can be used for wireless charging.

Figure 5:
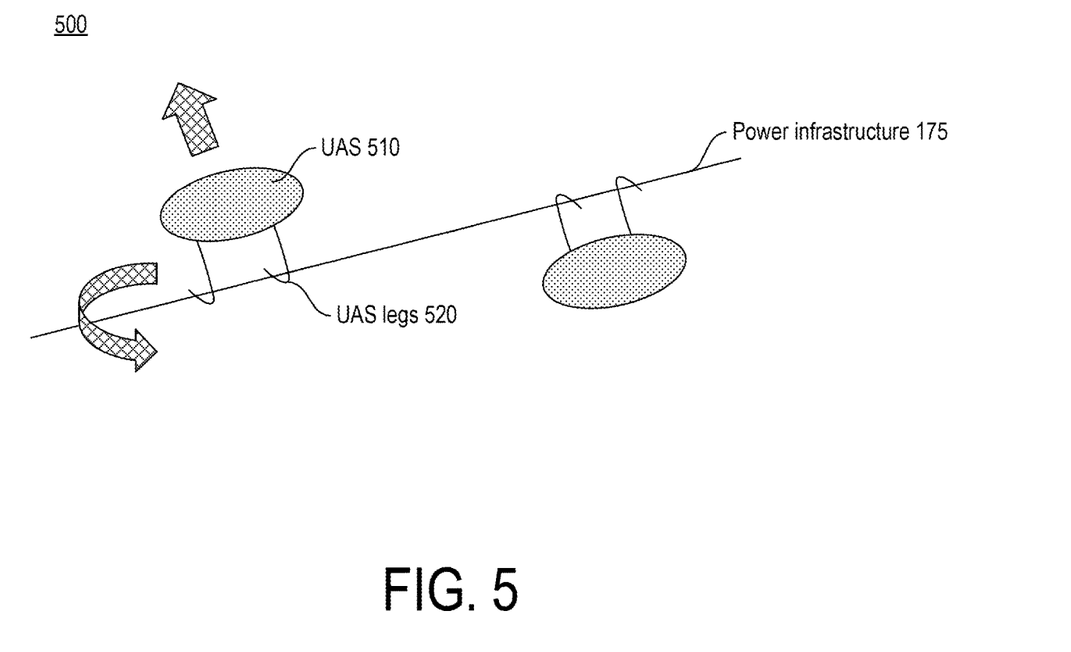
FIG. 5 is an illustration of an implementation of perching for charging a UAS with a power infrastructure.

FIG. 5 is an illustration of an implementation of perching 500 for charging a UAS with a power infrastructure. A UAS 510 (also referred to as a UAV) comprises one or more legs 520 that are configured to hook onto, or otherwise attach to, a power infrastructure, such as a power line of the power infrastructure 175. In this manner, the UAS 510 may perch onto the power infrastructure 175 while charging using any one or more of the charging techniques described herein, depending on the implementation.

Thus, in an implementation, one or more legs of a UAV (such as the UAS 510) may have a curved area to hook onto a power infrastructure, such as a power line of the power infrastructure 175. A touch-rotate motion will provide a perching position.

Figure 6:
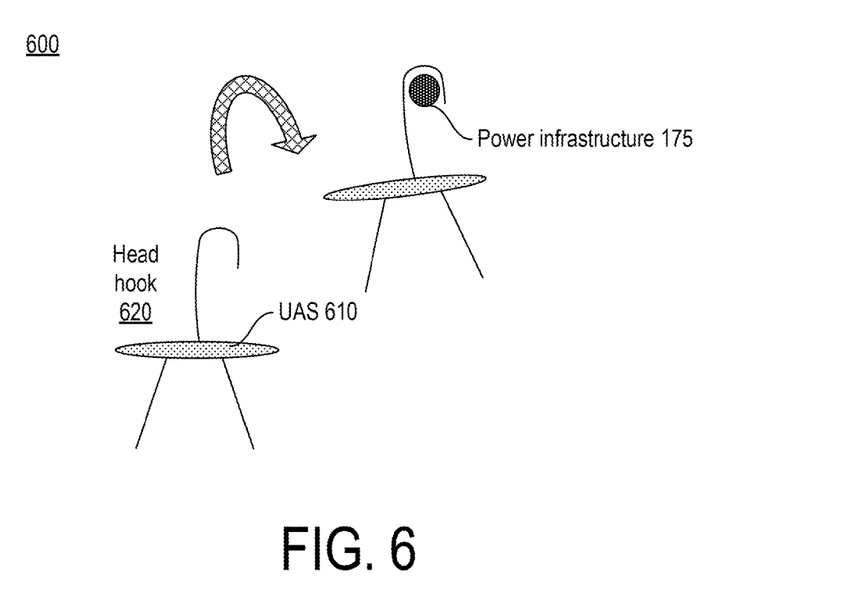
FIG. 6 is an illustration of another implementation of perching for charging a UAS with a power infrastructure.

FIG. 6 is an illustration of another implementation of perching 600 for charging a UAS with a power infrastructure. A UAS 610 (also referred to as a UAV) comprises a head hook 620 that is configured to dangle or hook onto, or otherwise attach to, a power infrastructure, such as a power line of the power infrastructure 175. In this manner, the UAS 610 may perch onto the power infrastructure 175 while charging using any one or more of the charging techniques described herein, depending on the implementation. Thus, in an implementation, a head of a UAV (such as the UAS 610) has a hook to dangle onto a power infrastructure, such as a power line of the power infrastructure 175.

Figure 7:
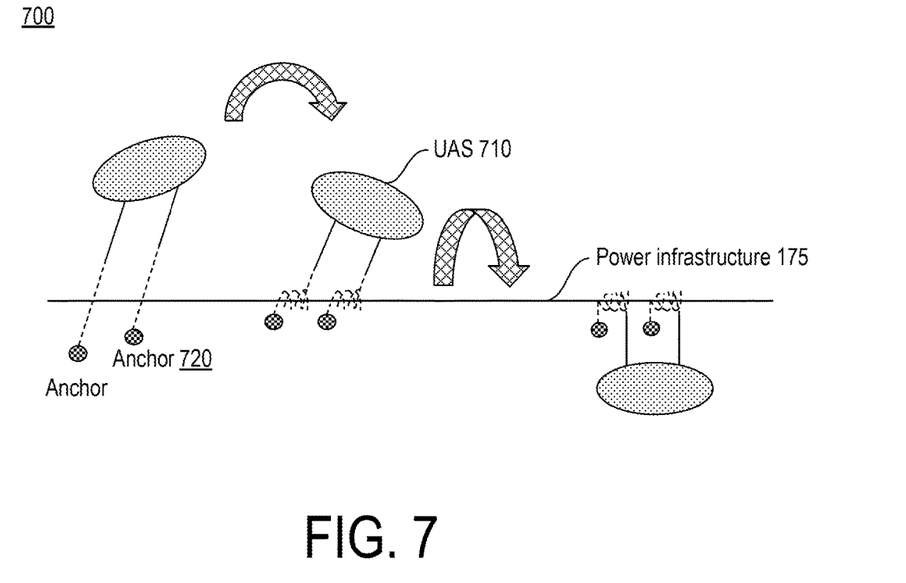
FIG. 7 is an illustration of another implementation of perching for charging a UAS with a power infrastructure.

FIG. 7 is an illustration of another implementation of perching 700 for charging a UAS with a power infrastructure. A UAS 710 (also referred to as a UAV) comprises one or more flexible anchors 720 (e.g., wires, or in conjunction with wires) that are configured to hook onto (e.g., by rotating while dangling), or otherwise attach to, a power infrastructure, such as a power line of the power infrastructure 175. In this manner, the UAS 710 may perch onto the power infrastructure 175 while charging using any one or more of the charging techniques described herein, depending on the implementation.

Thus, in an implementation, a UAV (such as the UAS 710) launches wires with anchors. While the anchors are dangling, the UAV rotates and secures its position onto a power infrastructure, such as a power line of the power infrastructure 175.

Figure 8:
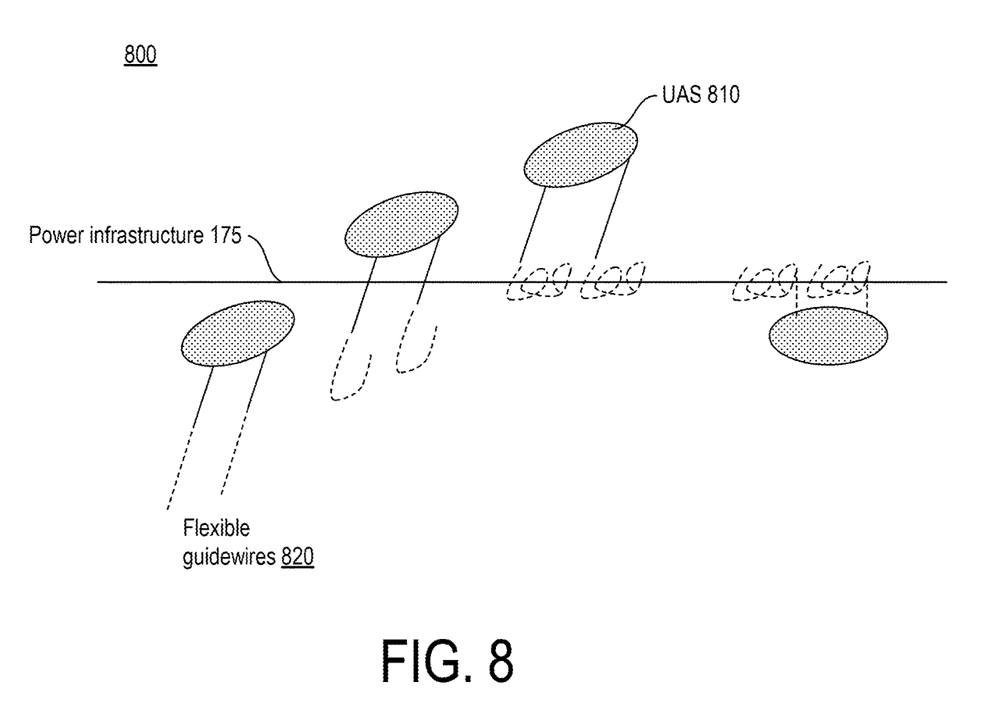
FIG. 8 is an illustration of another implementation of perching for charging a UAS with a power infrastructure.

FIG. 8 is an illustration of another implementation of perching 800 for charging a UAS with a power infrastructure. A UAS 810 (also referred to as a UAV) comprises one or more flexible guidewires 820 (e.g., wires, or in conjunction with wires) that are configured to hook onto (e.g., by winding or grabbing), or otherwise attach to, a power infrastructure, such as a power line of the power infrastructure 175. In this manner, the UAS 810 may perch onto the power infrastructure 175 while charging using any one or more of the charging techniques described herein, depending on the implementation.

Thus, in an implementation, a UAV (such as the UAS 810) launches guidewires and winds around a power infrastructure, such as a power line of the power infrastructure 175.

Figure 9:
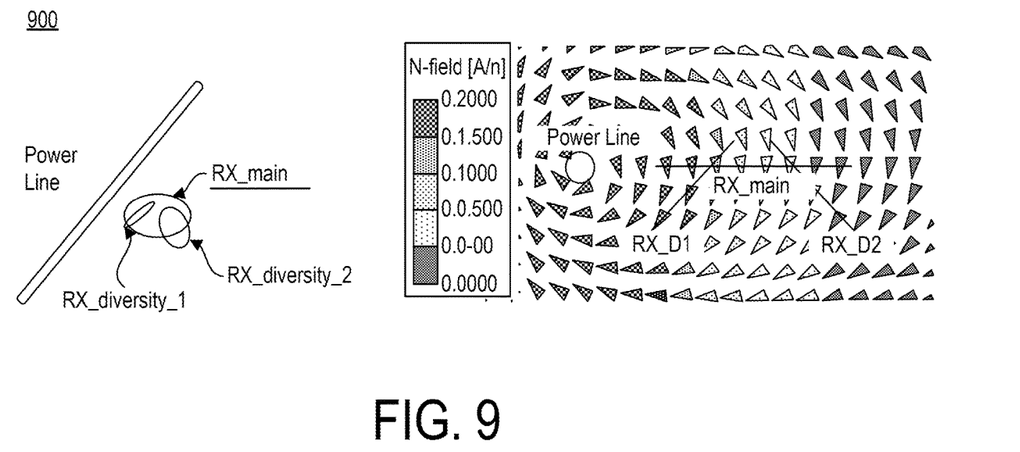
FIG. 9 is an illustration useful for describing an implementation of polarization diversity power combination.
Figure 10:
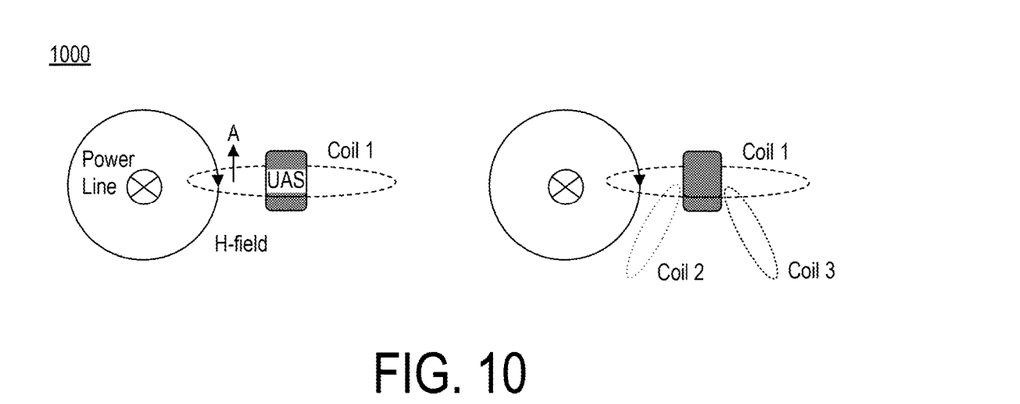
FIG. 10 is an illustration useful for describing another implementation of polarization diversity power combination.
Figure 11:
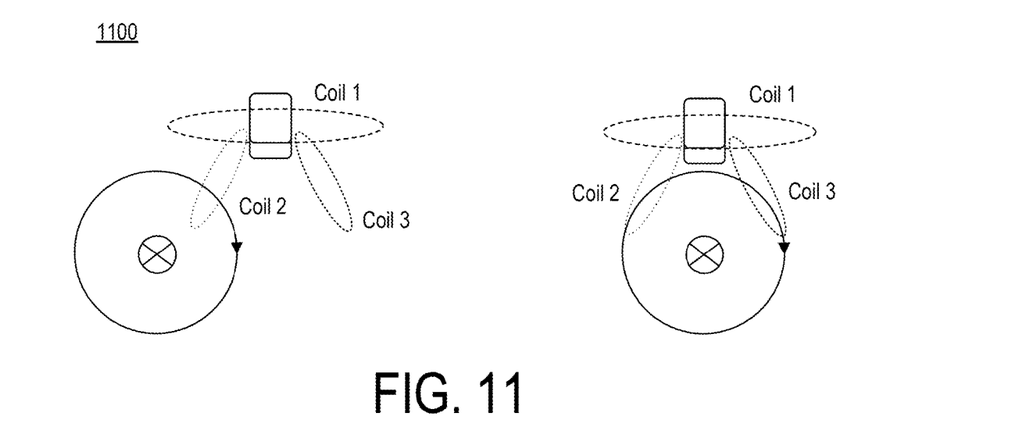
FIG. 11 is an illustration useful for describing another implementation of polarization diversity power combination.

FIG. 9 is an illustration useful for describing an implementation of polarization diversity power combination 900. FIG. 10 is an illustration useful for describing another implementation of polarization diversity power combination 1000. FIG. 11 is an illustration useful for describing another implementation of polarization diversity power combination 1100.

Here, three coils are on the receiver side (i.e., the UAS that is charging its battery) in the various arrangements shown. The greater the number of coils, the more coupling there is. Multi-angle coils can provide more magnetic coupling. The diversity coils significantly increase voltage and power induced. A switch can be used to turn off or on RX_main, RX_diversity1 (RX_D1), and RX_diversity2 (RX_D2) coils. More than two coils can be activated simultaneously.

Figure 12:
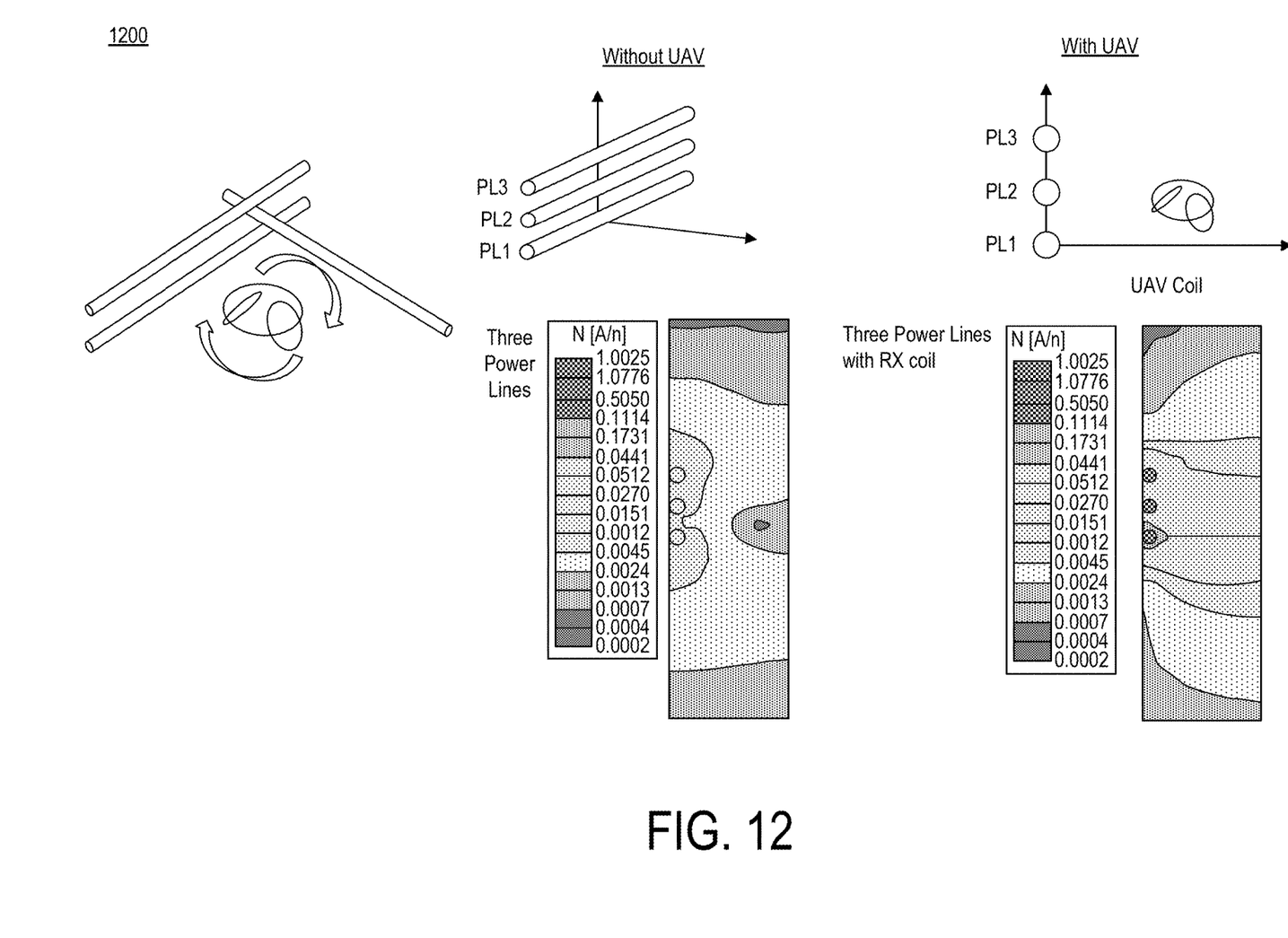
FIG. 12 is an illustration useful for describing an implementation of sensing an energy source in multiple power lines.

FIG. 12 is an illustration useful for describing an implementation of sensing an energy source in multiple power lines 1200. Here, an energy source (e.g., the power infrastructure) may be detected (by the UAS and the power infrastructure sensor) using multiple coils and machine learning algorithm (e.g., a neural network).

Energy harvesting can be maximized by adjusting roll, pitch, and yaw based upon magnetic fields polarization and/or distribution.

Magnetic fields can come from various directions. Thus, a UAS detects magnitude, position, and polarization of surrounding magnetic fields. Then, the UAS configures the coils to maximize power reception.

Thus, a UAS in accordance with features and aspects described herein is autonomous, may always be wirelessly charged (e.g., with high induced voltage), and can make use of weak energy. Moreover, various charging techniques can be used, such as in-flight, trickle, perching, and/or parking. Dynamic flight is supported using multi-angle MIMO coils. Additionally or alternatively, faster charging can be achieved with a supercapacitor and slower charging can be achieved with a battery.

FIG. 13 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 13, an exemplary system for implementing aspects described herein includes a computing device, such as computing device 1300. In its most basic configuration, computing device 1300 typically includes at least one processing unit 1302 and memory 1304. Depending on the exact configuration and type of computing device, memory 1304 may be volatile (such as random access memory (RAM)), non-volatile (such as read-only memory (ROM), flash memory, etc.), or some combination of the two. This most basic configuration is illustrated in FIG. 13 by dashed line 1306.

Computing device 1300 may have additional features/functionality. For example, computing device 1300 may include additional storage (removable and/or non-removable) including, but not limited to, magnetic or optical disks or tape. Such additional storage is illustrated in FIG. 13 by removable storage 1308 and non-removable storage 1310.

Computing device 1300 typically includes a variety of computer readable media. Computer readable media can be any available media that can be accessed by the device 1300 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1304, removable storage 1308, and non-removable storage 1310 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1300. Any such computer storage media may be part of computing device 1300.

Computing device 1300 may contain communication connection(s) 1312 that allow the device to communicate with other devices. Computing device 1300 may also have input device(s) 1314 such as a keyboard, mouse, pen, voice input device, touch input device, etc. Output device(s) 1316 such as a display, speakers, printer, etc. may also be included. All these devices are well known in the art and need not be discussed at length here.

In an implementation, a method of wirelessly charging an unmanned aerial system (UAS) comprises: during flight, detecting a power infrastructure, by the UAS; navigating to the power infrastructure, by the UAS; and autonomously charging an energy storage device of the UAS using the power infrastructure, by the UAS.

Implementations may include some or all of the following features. Detecting the power infrastructure is performed by a power infrastructure sensor of the UAS. Detecting the power infrastructure is performed responsive to a power level of the UAS falling below a threshold. The energy storage device comprises at least one of a battery or a supercapacitor. The charging comprises in-flight charging that uses ambient electromagnetic energy. The charging comprises trickle charging which provides dynamically charging power control through detecting nearby electromagnetic radiation. The charging comprises stationary charging including at least one of perching, parking, or resting on at least one of high-voltage power lines, substations, or infrastructure. The charging comprises multi-angle multiple input, multiple output (MIMO) charging which comprises increasing mutual coupling through multi-angle coils. The method further comprises after charging is completed, continuing to operate in flight, by the UAS.

In an implementation, an unmanned aerial system (UAS) comprises: a power infrastructure sensor configured to detect, during a flight of the UAS, a power infrastructure; a navigational system configured to navigate the UAS to the power infrastructure; an energy storage device configured to provide power to the UAS; and a charging module configured to autonomously charge the energy storage device of the UAS using the power infrastructure.

Implementations may include some or all of the following features. Detecting the power infrastructure is performed responsive to a power level of the UAS falling below a threshold. The energy storage device comprises at least one of a battery or a supercapacitor. The charging comprises at least one of: in-flight charging that uses ambient electromagnetic energy; and trickle charging which provides dynamically charging power control through detecting nearby electromagnetic radiation. The charging comprises stationary charging including at least one of perching, parking, or resting on at least one of high-voltage power lines, substations, or infrastructure. The charging comprises multi-angle multiple input, multiple output (MIMO) charging which comprises increasing mutual coupling through multi-angle coils. The UAS is configured to, after charging is completed, continue to operate in flight.

In an implementation, a system for wirelessly charging an unmanned aerial system (UAS) comprises: at least one processor; and a memory storing instructions that when executed by the at least one processor cause the at least one processor to: detect a power infrastructure during flight of the UAS; navigate the UAS to the power infrastructure; and autonomously charge an energy storage device of the UAS using the power infrastructure.

Implementations may include some or all of the following features. Detecting the power infrastructure is performed responsive to a power level of the UAS falling below a threshold. The charging comprises at least one of: in-flight charging that uses ambient electromagnetic energy; trickle charging which provides dynamically charging power control through detecting nearby electromagnetic radiation; stationary charging including at least one of perching, parking, or resting on at least one of high-voltage power lines, substations, or infrastructure; and multi-angle MIMO charging which comprises increasing mutual coupling through multi-angle coils. The instructions further comprise instructions that when executed by the at least one processor cause the at least one processor to, after charging is completed, continue to operate the UAS in flight.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of wirelessly charging an unmanned aerial system (UAS), the method comprising:
   during flight, detecting a power infrastructure by detecting nearby electromagnetic radiation, by the UAS;
   navigating to the power infrastructure, by the UAS; and
   autonomously charging an energy storage device of the UAS using the power infrastructure, by the UAS, wherein the charging comprises one of:
   in-flight charging that uses ambient electromagnetic energy;

trickle charging which provides dynamically charging power control through the detected nearby electromagnetic radiation; and multi-angle multiple input, multiple output (MIMO) charging which comprises increasing mutual coupling through multi-angle coils.

2. The method of claim 1, wherein the detecting the power infrastructure is performed by a power infrastructure sensor of the UAS.

3. The method of claim 1, further comprising:
determining that a power level of the UAS has fallen below a threshold; and
in response to the determination, detecting the power infrastructure.

4. The method of claim 1, wherein the energy storage device comprises at least one of a battery or a supercapacitor.

5. The method of claim 1, wherein the charging further comprises stationary charging including at least one of perching, parking, or resting on high-voltage power lines.

6. The method of claim 1, further comprising after charging is completed, continuing to operate in flight, by the UAS.

7. An unmanned aerial system (UAS) comprising:
a power infrastructure sensor configured to detect, during a flight of the UAS, a power infrastructure by detecting nearby electromagnetic radiation;
a navigational system configured to navigate the UAS to the power infrastructure;
an energy storage device configured to provide power to the UAS; and
a charging module configured to autonomously charge the energy storage device of the UAS using the power infrastructure, wherein the charging comprises one of:
in-flight charging that uses ambient electromagnetic energy;
trickle charging which provides dynamically charging power control through the detected nearby electromagnetic radiation; and
multi-angle multiple input, multiple output (MIMO) charging which comprises increasing mutual coupling through multi-angle coils.

8. The UAS of claim 7, further comprising:
determining that a power level of the UAS has fallen below a threshold; and
in response to the determination, detecting the power infrastructure.

9. The UAS of claim 7, wherein the energy storage device comprises at least one of a battery or a supercapacitor.

10. The UAS of claim 7, wherein the charging further comprises stationary charging including at least one of perching, parking, or resting on high-voltage power lines.

11. The UAS of claim 7, wherein the UAS is configured to, after charging is completed, continue to operate in flight.

12. A system for wirelessly charging an unmanned aerial system (UAS), the system comprising:
at least one processor; and
a memory storing instructions that when executed by the at least one processor cause the at least one processor to:
detect a power infrastructure by detecting nearby electromagnetic radiation during flight of the UAS;
navigate the UAS to the power infrastructure; and
autonomously charge an energy storage device of the UAS using the power infrastructure, wherein the charging comprises one of:
in-flight charging that uses ambient electromagnetic energy;
trickle charging which provides dynamically charging power control through the detected nearby electromagnetic radiation; and
multi-angle multiple input, multiple output (MIMO) charging which comprises increasing mutual coupling through multi-angle coils.

13. The system of claim 12, further comprising:
determining that a power level of the UAS has fallen below a threshold; and
in response to the determination, detecting the power infrastructure.

14. The system of claim 12, wherein the charging comprises:
stationary charging including at least one of perching, parking, or resting on high-voltage power lines.

15. The system of claim 12, wherein the instructions further comprise instructions that when executed by the at least one processor cause the at least one processor to, after charging is completed, continue to operate the UAS in flight.

* * * * *